March 20, 1945.　　　R. A. McCONNELL　　　2,371,636
MEANS FOR DETERMINING THE SURFACE ELECTRICAL
RESISTANCE OF CONDUCTING SHEETS
Filed April 15, 1942
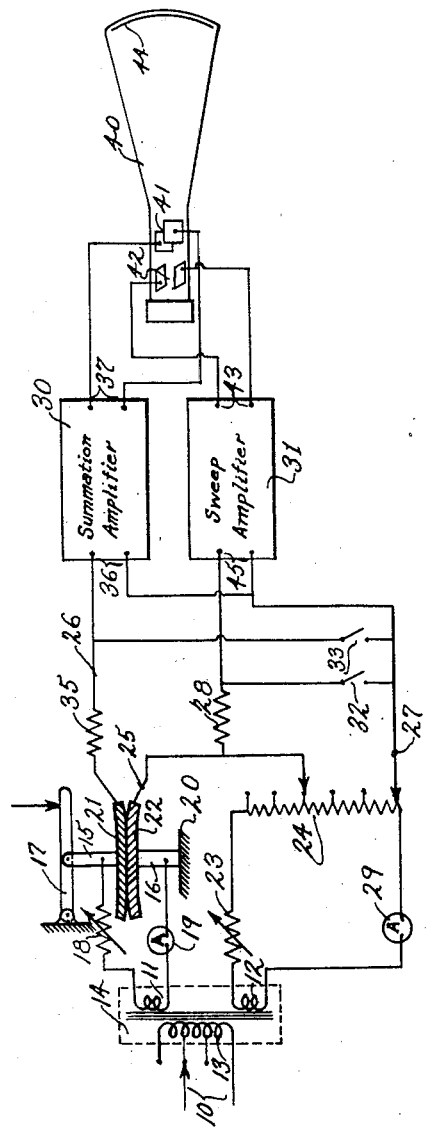
INVENTOR
Robert A. McConnell
BY
ATTORNEY Patented Mar. 20, 1945

2,371,636

UNITED STATES PATENT OFFICE 2,371,636

MEANS FOR DETERMINING THE SURFACE ELECTRICAL RESISTANCE OF CONDUCTING SHEETS

Robert A. McConnell, Belmont, Mass.

Application April 15, 1942, Serial No. 439,090

5 Claims. (Cl. 175—183)

(Granted under the act of March 3, 1883, as amended April 30, 1928; 370 O. G. 757)

This invention relates to resistance welding of metallic sheets and more particularly to the method of and apparatus for ascertaining the cleanliness of said sheets by comparing the surface electrical resistance of the metallic sheets with a standard resistance.

The nature of this invention is perhaps best understood when discussed in reference with a particular application of it as applied to aircraft construction; wherein it is necessary in the fabrication of certain aircraft structures to spot or seam weld large aluminum sheets. This invention provides a device and method which will permit an unskilled operator to tell with a minimum number of operations in a minimum length of time whether the superimposed surfaces of the aluminum sheets used in the aircraft construction have an intersheet electrical resistance above or below a chosen standard value when placed between electrodes similar to those employed in the spot welding process.

It is apparent that in quantity production work it is difficult to acquire uniform metallic sheets having uniform or even substantially uniform surface resistances since some of the sheets as received for the welding process may be bright and clean, having low surface resistance, while others are coated with a film of oxide or other substance and have a surface resistance materially higher than the surface resistance of the clean sheets. When unclean metallic sheets are used, the surface resistance of the sheets at the weld will be high and the flow of current will be low compared to the magnitude of current normally attained when clean metallic sheets are used. Consequently, the welds formed with the unclean sheets will be inferior unless the high surface resistance is taken into consideration in adjusting the pressure applied to the welding electrodes and/or the time of current flow in the welding circuit. In the event the pressure and time of current flow are to remain constant, the surface would have to be cleaned before being subjected to the welding process.

In the apparatus shown, illustrating the new and improved method of determining the relative value of surface resistance of the metallic sheets to be used in the welding process, the sheets are shown inserted between two electrodes similar to or identical with the welding electrodes, and an alternating current potential is applied to the metallic sheets as the same are firmly pressed together by the application of a substantially constant pressure to the electrodes. The voltage drop across the metallic sheets is compared with the voltage drop across a standard resistance by noting the slope of the path of the electron beam as traced upon the fluorescent screen of a cathode ray oscilloscope.

It is an object of this invention, therefore, to determine the cleanliness of said sheets for the welding process by examining the electrical surface resistance of the metallic sheets under conditions approximating the conditions which prevail when the sheets are subjected to a resistance welding process.

It is a further object of this invention to provide a method wherein the resistance of the metallic sheets may be determined under conditions similar to those existing during the welding process by simply noting the slope of the path formed by the electron beam in a cathode ray tube to determine whether or not the resistance is above or below a known resistance.

This invention also has for its object the provision of apparatus by means of which the resistance may be measured under conditions which approximate the conditions which exist during the welding process and by simply noting the slope of the path of the aforementioned cathode ray.

Further and more specific objects of this invention will be apparent as this invention is described in connection with the drawing accompanying this specification wherein:

A single figure is provided which illustrates schematically by means of wiring diagram a preferred embodiment of this invention.

Referring now to the drawing, the form of my invention, as illustrated, comprises a suitable source of alternating current potential 10 shown connected to the selective taps of the primary winding 13 of the transformer 14 which is wound with two independent secondary windings indicated at 11 and 12 in the drawing. The metallic sheets 21 and 22, shown in fragmentary section, are arranged between the spot welding electrodes 15 and 16 and are adapted to be firmly pressed into contact by the application of force to the electrode 15 through the pivoted lever 17. The lower electrode 16 is preferably insulated and secured to a stationary base plate 20 which is designed to withstand the pressure applied thereto by means of the pivoted lever 17. The electrode 15 is also insulated and secured to the pivoted lever 17.

The secondary winding 11 of the transformer 14 is connected to the series test circuit, which includes the adjustable resistor 18, the top electrode 15, the work pieces or metallic sheets 21 and 22, the lower electrode 16, and the ammeter 19. The secondary winding 12 of the transformer 14 is connected to what is hereinafter referred to as a series comparison circuit which includes the variable resistance element 23, the standard comparative resistance element 24 having a value preferably of about ten thousand micro-ohms with connecting taps extending therefrom which provide connections to any portion thereof varying from one to ten thousand micro-ohms, and an ammeter 29.

The potential drop existing across the metallic sheets 21 and 22 is connected by means of the conductive lead 25 to a circuit in series opposition with the potential drop occurring across a selected portion of the standard comparison resistor 24. The said circuit to which the difference in potential drop existing between the metallic sheets 21 and 22 and the selected portion of the resistance element 24 is applied includes the current limiting resistance 35 and the conductors 26 and 27 which are connected to the input terminals 36 of a summation amplifier 30. The output terminals 37 of the summation amplifier 30 which has appropriate sensitivity, frequency response, and overloading characteristics and controls is connected to the deflection plates 41 of the cathode ray oscilloscope 40. In the position illustrated, the application of a suitable potential to these plates will produce a horizontal deflection of said ray. The vertically acting deflection plates 42 are connected to the output terminals 43 of the sweep amplifier 31. The input terminals 45 of this sweep amplifier 31 are connected across a selected portion of the standard comparative resistor 24 through the current limiting resistor 28. The current limiting resistors 28 and 35 are provided merely to prevent damage to the amplifiers 30 and 31 which might otherwise arise as a result of an accidental excessive current flow in their input circuits. The auxiliary short circuiting switches 32 and 33 are also provided to prevent over loading of the amplifiers 30 and 31 at any time when resistance comparisons of the metallic sheets are not being carried out.

To obtain a comparison of the inter surface resistance of the superimposed metallic sheets with a portion of the standard comparative resistance element 24, the equipment described above is utilized in the following manner:

The plates are first inserted between the electrodes 15 and 16 and are pressed firmly into contact by the application of a substantially constant force to the pivoted lever 17. The current flowing in the series test circuit as indicated by the ammeter 19 is adjusted to a normal suitable value by means of the adjustable resistor 18. The current flowing from the secondary winding 12 through the standard comparative resistor 24 as indicated by the ammeter 29 is also adjusted by means of the adjustable resistor 23 to a value which is preferably the same as or suitably related to the current in the series test circuit. The constants of the test and comparative circuits are preferably selected so that the power factor angles of the current flow in both circuits are substantially equal. The frequencies of both currents are equal since they originate from the same power supply source. Consequently, the potential drop across the inner surfaces of the metallic plates 21 and 22 and the potential drop across a portion of the standard comparative resistance element 24 are in phase and may be connected in series opposition to produce a potential across the input terminals 36 which is at all times equal to the difference in potential drop across the metallic sheets and the selected portion of the standard resistance comparative element. The potential drop occurring across the selected portion of the standard resistance element since it is in phase with the drop across the metallic sheets is also utilized as the input voltage to the sweep amplifier 31. The amplification factors of the amplifiers 30 and 31 are both adjusted to appropriate values. The phase delay time of each amplifier should be equal or negligible; and the harmonic content and phase distortion must be low throughout all the circuits if accurate results are to be obtained.

It is apparent that the voltage impressed across the summation amplifier's input terminals 36 will be equal to zero when the voltage developed across the test sheets 21 and 22 and the selected portion of the standard resistance 24 are equal and opposite. If, for example, the current flowing in the series test circuit and the series comparison circuit are adjusted to be equal and have equal phase angles, then the voltage applied to the summation amplifier 30 will be zero when the resistance between the test sheets 21 and 22 equals the resistance of the selected portion of the standard comparative resistor 24. For these conditions the path of the cathode ray as traced on the fluorescent screen 44 of the oscilloscope will be a vertical straight line. If, however, the resistance between the test sheets 21 and 22 is less than or is greater than the selected portion of the standard comparative resistor 24 then the output of the summation amplifier 30 will add vectorially to the output of the sweep amplifier 31 to produce on the fluorescent screen 44 of the cathode ray oscilloscope 40 a straight line path of the deflected cathode ray either to one side or the other of the vertical, depending upon whether the resistance of the test sheets 21 or 22 is greater or less than the selected portion of the standard resistance 24. Thus the slope of the line formed on the fluorescent screen 44 of the cathode ray tube 40 will indicate to the operator the value of the resistance of the superimposed test sheets 21 or 22 as compared to the selected portion of the standard resistance 24.

It should be obvious from the foregoing that numerous departures may be made from the disclosed particular modification of this invention without departing from the spirit thereof. For example, it is self-evident that the pair of vertical deflector plates could be energized from a separate source of alternating current having sufficient voltage, and the same frequency as the power transformer 14, as well as a known suitable or controllable phase angle with respect to the output voltage of the power transformer 14. Likewise, it should be pointed out that although the current flow through the test sheet has been regarded as a linear function of the applied voltage, the apparatus may be useful even though the current in the series test circuit is non-linear with respect to applied voltage. Under these conditions the pattern observed upon the fluorescent screen 44 of the cathode ray tube will not be a straight line, but will in general still permit easy recognition of the relative value of the resistance of the test sheets 21 and 22.

While the above invention has been described with reference to specific apparatus and to the specific application of welding, it is to be understood that many modifications and applications of it may be made without departing from the spirit or scope of the appended claims.

The invention described herein may be manufactured and used by or for the Government of the United States of America for governmental purposes without the payment of any royalties thereon or therefor.

I claim:

1. In a system for investigating the inter surface resistance of at least two metallic sheets adapted to be welded together, for the purpose of ascertaining the cleanliness of said sheets for the welding process, the combination including, a pair of electrodes, a first source of alternating current potential connected to said electrodes, means for applying a pressure to said sheets through said electrodes in order to bring their inner surfaces firmly into contact, a known resistance element, a second source of alternating current potential in phase with said first alternating potential connected in series with said known resistance element, a cathode ray beam type tube, means for subjecting the electron beam of said tube to a periodically changing deflecting force in phase with said alternating potentials to produce a substantially straight line path for said beam, and means for effecting an inclination of said beam path by an amount proportional to and in a direction dependent upon the difference in the potential drops across said known resistance element and said sheets whereby the relative value of the resistance of said sheets may be determined by noting the slope of the path of said beam.

2. In a system for investigating the inter surface resistance of at least two superimposed metallic sheets, adapted to be welded together, for the purpose of ascertaining the cleanliness of said sheets for the welding process, the combination including, an alternating current supply source, circuit forming means connecting said sheets in series with said supply source so that the voltage drop across said sheets will be dependent upon the resistance of their inner surfaces, a cathode ray beam type tube, means for causing the electron beam of said tube to be deflected in synchronism with the frequency of said alternating current supply source to trace a line path on the fluorescent screen thereof, and means causing the electron beam to take a path inclined to its conventional straight line path at an angle proportional to, and in a direction dependent upon the sense of and the difference between said voltage drop across said sheets and the voltage drop across a known resistance, whereby the relative inter surface resistance of said sheets may be determined by noting the inclination in the path of said electron beam.

3. In a system for investigating the inter surface resistance of the superimposed portions of at least two metallic sheets adapted to be welded together at their said superimposed surfaces, the combination including, a first circuit having a first power supply source connected to the superimposed portions of said metallic sheets, a second circuit having a second power supply source connected to a fixed known resistance element, means for adjusting the current in at least one of said circuits to a known convenient ratio with the current flowing in the other of said circuits, a cathode ray beam type tube, and means for applying a deflecting force to the electron beam thereof, said force being proportional to and in a direction dependent upon the difference in potential across the superimposed portions of the sheets and said known resistance element, whereby the relative value of the inter surface resistance of the superimposed portion of said sheets compared to the relative value of said resistance element may be determined by noting the position of said beam.

4. In a system for investigating the inner surface resistance of at least two superimposed metallic members for the purpose of ascertaining the relative cleanliness of the adjacent faces of said members prior to being welded together, the combination comprising, means for applying pressure to said members, means for producing a first alternating current voltage, circuit forming means connecting said members in circuit with said voltage to derive a voltage drop across said members, a cathode ray beam type tube, means for causing the electron beam of said tube to be deflected in synchronism with the frequency of said voltage to trace a normal path on the screen of said tube, means for producing a second comparison alternating current voltage, means for producing a third alternating current voltage variable as the difference between the voltage drop across said members and said second voltage, and means for applying said third voltage to effect a deviation of said beam from its normal path, the amount of such deviation constituting an indication of the inter surface resistance of said members.

5. In a system for investigating the inter surface resistance of at least two superimposed metallic members for the purpose of ascertaining the relative cleanliness of the adjacent faces of said members prior to being welded together, the combination comprising, means for applying pressure to said members, means for producing an alternating current voltage, circuit forming means connecting said members in circuit with said voltage to derive a drop in voltage across said members, a cathode ray oscilloscope, means for causing the electron beam of said oscilloscope to be deflected in synchronism with the frequency of said voltage to trace a normal path on the fluorescent screen of said oscilloscope, means for producing a comparison alternating current voltage, means for applying the drop in voltage obtained across said members in opposition to said comparison voltage, and means utilizing the difference in said voltages for effecting a deviation of said electron beam from its normal path, the sense and amount of such deviation constituting a measure of the inter surface resistance of the adjacent faces of said members as being less or greater than a preselected amount as determined by the value of said comparison voltage.

ROBERT A. McCONNELL.